United States Patent
Hu et al.

(10) Patent No.: US 12,368,384 B2
(45) Date of Patent: Jul. 22, 2025

(54) POWER SUPPLY CONVERSION CIRCUIT AND ELECTRONIC DEVICE

(71) Applicant: HUAWEI TECHNOLOGIES CO., LTD., Guangdong (CN)

(72) Inventors: Zhixiang Hu, Dongguan (CN); Zhihua Liu, Dongguan (CN); Gang Ye, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 237 days.

(21) Appl. No.: 18/307,989

(22) Filed: Apr. 27, 2023

(65) Prior Publication Data
US 2023/0402934 A1 Dec. 14, 2023

Related U.S. Application Data (63) Continuation of application No. PCT/CN2020/124501, filed on Oct. 28, 2020.

(51) Int. Cl.
*H02M 3/335* (2006.01)
*H02M 1/00* (2006.01)
*H02M 3/00* (2006.01)

(52) U.S. Cl.
CPC ..... *H02M 3/33592* (2013.01); *H02M 1/0058* (2021.05); *H02M 1/0074* (2021.05);
(Continued)

(58) Field of Classification Search
CPC ......... H02M 3/33507; H02M 3/33571; H02M 3/33592; H02M 3/3376
See application file for complete search history.

(56) References Cited

U.S. PATENT DOCUMENTS

| 4,154,387 A | 5/1979 | Booth et al. |
| 7,170,764 B2 | 1/2007 | Vinciarelli |

(Continued)

FOREIGN PATENT DOCUMENTS

| CN | 1630911 B | 5/2012 |
| CN | 105207487 A | 12/2015 |

(Continued)

OTHER PUBLICATIONS

Hangseok Choi: "AN-4151 Half-Bridge LLC Resonant Converter Design Using FSFR-Series Fairchild Power Switch (FPS(TM))", Oct. 22, 2014 (Oct. 22, 2014), pp. 1-21, XP093259720.

*Primary Examiner* — Gary A Nash
(74) *Attorney, Agent, or Firm* — WOMBLE BOND DICKINSON (US) LLP (57) ABSTRACT

The power supply conversion circuit includes an isolation transformer, and the isolation transformer includes at least two primary coils and at least one secondary coil. Each primary coil is connected to a half-bridge circuit by using a first resonant network, and half-bridge circuits corresponding to the at least two primary coils are connected in series between two electrodes of a power supply. The half-bridge circuit is connected in parallel to a voltage divider, the voltage divider includes a first capacitor and a second capacitor that are connected in series, a first terminal of the first resonant network is connected to an intermediate node of the half-bridge circuit, and a second terminal of the first resonant network is connected to a connection point between the first capacitor and the second capacitor.

16 Claims, 9 Drawing Sheets

(52) U.S. Cl.
CPC .......... *H02M 1/0077* (2021.05); *H02M 3/01* (2021.05); *H02M 3/33573* (2021.05); *H02M 3/33571* (2021.05)

(56) References Cited

U.S. PATENT DOCUMENTS

| | | | |
|---|---|---|---|
| 7,212,419 B2 | 5/2007 | Vinciarell | |
| 7,408,795 B2 | 8/2008 | Vinciarelli | |
| 7,782,639 B2 | 8/2010 | Vinciarelli | |
| 7,940,540 B2 | 5/2011 | Vinciarelli | |
| 8,227,939 B2 | 7/2012 | Jacobson et al. | |
| 9,148,064 B2 * | 9/2015 | Liu .................. | H02M 3/33561 |
| 2008/0081244 A1 | 4/2008 | Hammond | |
| 2010/0142234 A1 | 6/2010 | Abolhassani et al. | |
| 2012/0262953 A1 * | 10/2012 | Jungreis .............. | H02M 3/285 |
| | | | 363/21.02 |
| 2016/0065081 A1 * | 3/2016 | Raju ................ | H02M 3/33571 |
| | | | 29/602.1 |
| 2016/0072396 A1 | 3/2016 | Deboy et al. | |
| 2016/0190943 A1 * | 6/2016 | Chen ................ | H02M 3/33569 |
| | | | 363/21.06 |
| 2018/0262117 A1 * | 9/2018 | Lu ..................... | H02M 3/33571 |
| 2018/0269795 A1 * | 9/2018 | Zhou ................. | H02M 3/33592 |
| 2019/0043660 A1 * | 2/2019 | Jin .................... | H02M 3/33592 |
| 2019/0052177 A1 * | 2/2019 | Lu ........................ | H02M 7/217 |

FOREIGN PATENT DOCUMENTS

| | | |
|---|---|---|
| CN | 107276418 A | 10/2017 |
| CN | 108054922 A | 5/2018 |
| CN | 109167518 A | 1/2019 |

\* cited by examiner

POWER SUPPLY CONVERSION CIRCUIT AND ELECTRONIC DEVICE

CROSS-REFERENCE TO RELATED APPLICATIONS

This application is a continuation of International Application No. PCT/CN2020/124501, filed on Oct. 28, 2020, the disclosure of which is hereby incorporated by reference in its entirety.

TECHNICAL FIELD

This application relates to the power supply field, and in particular, to a power supply conversion circuit and an electronic device.

BACKGROUND

Figure 1:
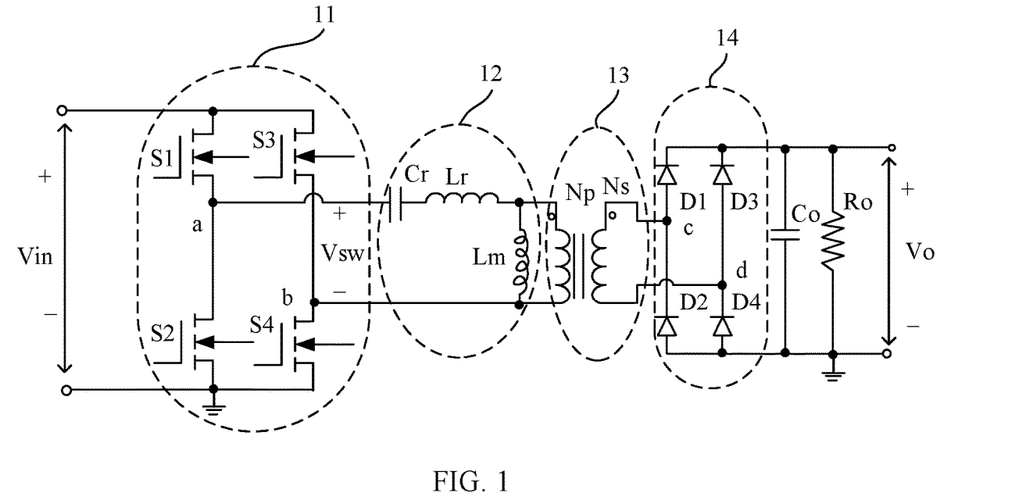
FIG. 1 is a schematic diagram of a structure of a power supply conversion circuit according to an embodiment of this application.

Power conversion of a power supply conversion circuit is an important issue in many different electronic applications. An important aspect of power conversion is to efficiently convert power, that is, to keep a loss related to power conversion as low as possible. As shown in FIG. 1, a conventional power supply conversion circuit is provided. The power supply conversion circuit includes a bridge circuit 11, an LLC (magnetic inductance-series inductance-resonant capacitance, magnetic inductor, series inductor, and resonant capacitor) resonant cavity 12, a transformer 13, and a rectifier circuit 14. Currently, in a power supply conversion circuit that uses an LLC topology, an input direct current signal is mainly sent to the bridge circuit 11 and converted into an alternating current signal, and then the alternating current signal is input to the LLC resonant cavity 12 and the transformer 13 for output by using the rectifier circuit 14. All power of the direct current signal may pass through switching transistors of the bridge circuit 11, the LLC resonant cavity 12, the transformer 13, and the rectifier circuit 14. Because the switching transistors in the bridge circuit need to process all the power of the direct current signal, a withstand voltage of the switching transistors may be relatively high, and a gain range of power conversion of a switching transistor with a high withstand voltage is limited within a switching frequency range, causing low power conversion efficiency.

SUMMARY

This application provides a power supply conversion circuit and an electronic device, to improve power conversion efficiency of the power supply conversion circuit.

According to a first aspect, a power supply conversion circuit is provided. The power supply conversion circuit includes an isolation transformer, and the isolation transformer includes at least two primary coils and at least one secondary coil. Each primary coil is connected to a half-bridge circuit by using a first resonant network, and half-bridge circuits corresponding to the at least two primary coils are connected in series between two electrodes of a power supply. The half-bridge circuit is connected in parallel to a voltage divider, the voltage divider includes a first capacitor and a second capacitor that are connected in series, one terminal of the first resonant network is connected to an intermediate node of the half-bridge circuit, and the other terminal of the first resonant network is connected to a connection point between the first capacitor and the second capacitor. The secondary coil is connected to an input terminal of a rectifier circuit, and an output terminal of a rectifier circuit corresponding to the at least one secondary coil is connected in series between two electrodes of an output terminal of the power supply conversion circuit. In the power supply conversion circuit provided in the foregoing solution, because the isolation transformer includes the at least two primary coils, the primary coils are separately connected to the half-bridge circuits by using resonant networks, the half-bridge circuits corresponding to the at least two primary coils are connected in series to the power supply, and the half-bridge circuit is connected in parallel to the voltage divider, a voltage of the power supply is divided by at least two half-bridge circuits. For example, when two primary coils are included, a divided voltage of each half-bridge circuit is one half of the voltage of the power supply. When three primary coils are included, a divided voltage of each half-bridge circuit is one third of the voltage of the power supply. Therefore, the half-bridge circuit may use a switching transistor with a lower withstand voltage. In comparison with the conventional technology, performance of the switching transistor with a lower withstand voltage is better than that of a switching transistor with a higher withstand voltage. This is mainly manifested as follows: The switching transistor with a lower withstand voltage has a greater gain range of power conversion within a switching frequency range, so that power conversion efficiency of the power supply conversion circuit can be improved.

In a possible embodiment, an example form of the half-bridge circuit is provided. The half-bridge circuit includes a first switching transistor and a second switching transistor, a first terminal of the first switching transistor is connected to a first terminal of the power supply or a first terminal of the first switching transistor is connected to an adjacent previous half-bridge circuit, a second terminal of the first switching transistor is connected to the intermediate node, a first terminal of the second switching transistor is connected to the intermediate node, and a second terminal of the second switching transistor is connected to a second terminal of the power supply or a second terminal of the second switching transistor is connected to an adjacent next half-bridge circuit.

In a possible embodiment, the first resonant network includes a first series resonant inductor and a first magnetic inductor. The first magnetic inductor is connected in parallel to the primary coil, one terminal of the first series resonant inductor is connected to the intermediate node, the other terminal of the first series resonant inductor is connected to one terminal of the first magnetic inductor, and the other terminal of the first magnetic inductor is connected to the connection point between the first capacitor and the second capacitor.

In a possible embodiment, the first resonant network includes a first series resonant inductor, a first magnetic inductor, and a first series resonant capacitor. The first magnetic inductor is connected in parallel to the primary coil, one terminal of the first series resonant inductor is connected to the intermediate node, the other terminal of the first series resonant inductor is connected to one terminal of the first magnetic inductor, and the other terminal of the first magnetic inductor is connected to the connection point between the first capacitor and the second capacitor. The first series resonant capacitor is connected in series between the one terminal of the first series resonant inductor and the intermediate node, or the first series resonant capacitor is connected in series between the other terminal of the first magnetic inductor and the connection point between the first capacitor and the second capacitor. Because the first resonant network is an LLC resonant network, zero voltage switch (ZVS) turn-on and zero current switch (ZCS) turn-off control over the switching transistor in the half-bridge circuit can be implemented, so that efficiency of the power supply conversion circuit is ensured.

In a possible embodiment, the secondary coil is connected to the input terminal of the rectifier circuit by using a second resonant network. The second resonant network includes a second series resonant capacitor, a second series resonant inductor, and a second magnetic inductor. A first terminal of the second series resonant capacitor is connected to a first input terminal of the rectifier circuit, a second terminal of the second series resonant capacitor is connected to a first terminal of the second series resonant inductor, a second terminal of the second series resonant inductor is connected to a first terminal of the second magnetic inductor, and a second terminal of the second magnetic inductor is connected to a second input terminal of the rectifier circuit. Because the second resonant network forms an LLC network, when a synchronous rectifier circuit is used as the rectifier circuit, in other words, when a rectifier tube in a rectifier bridge of the rectifier circuit is a switching transistor, ZVS turn-on and ZCS turn-off control over the switching transistor can be implemented, so that efficiency of the power supply conversion circuit is ensured.

In a possible embodiment, the rectifier circuit includes a synchronous rectifier circuit or a non-synchronous rectifier circuit. When the synchronous rectifier circuit is used as the rectifier circuit, a rectifier tube in a rectifier bridge of the rectifier circuit is a switching transistor; or when the non-synchronous rectifier circuit is used as the rectifier circuit, a rectifier tube in a rectifier bridge of the rectifier circuit is a diode.

In a possible embodiment, the power supply conversion circuit includes at least two secondary coils, and a rectifier circuit of any one of the secondary coils further includes a voltage regulator circuit. The voltage regulator circuit is disposed between a rectifier bridge of the rectifier circuit and an output terminal of the rectifier circuit, and the voltage regulator circuit is configured to adjust a voltage output by the rectifier bridge to the output terminal of the rectifier circuit. In this solution, the voltage regulator circuit only needs to perform voltage regulation on a voltage of an output terminal of a rectifier circuit corresponding to any secondary coil. Therefore, a requirement on a withstand voltage of a switching transistor in the voltage regulator circuit can be reduced, so that a low-voltage switching transistor with a lower withstand voltage can be used, thereby improving conversion efficiency.

In a possible embodiment, the voltage regulator circuit includes a buck-boost buckboost circuit, a buck buck circuit, and a boost boost circuit.

According to a second aspect, a power supply conversion circuit is provided. The power supply conversion circuit includes an isolation transformer, and the isolation transformer includes four primary coils and at least one secondary coil. Each primary coil is connected to a half-bridge circuit by using a first resonant network, and half-bridge circuits corresponding to the four primary coils are connected in series between two electrodes of a power supply. The half-bridge circuit is connected in parallel to a voltage divider, the voltage divider includes a first capacitor and a second capacitor that are connected in series, one terminal of the first resonant network is connected to an intermediate node of the half-bridge circuit, and the other terminal of the first resonant network is connected to a connection point between the first capacitor and the second capacitor. The secondary coil is connected to an input terminal of a rectifier circuit, and an output terminal of a rectifier circuit corresponding to the at least one secondary coil is connected in series between two electrodes of an output terminal of the power supply conversion circuit.

According to a third aspect, an electronic device is provided. The electronic device includes a power supply conversion circuit. The power supply conversion circuit is the foregoing power supply conversion circuit.

In a possible embodiment, a load connected to the power supply conversion circuit is further included.

For technical effects brought by any one of the possible embodiments of the second aspect and the third aspect, refer to technical effects brought by different embodiments of the first aspect. Details are not described herein again.

DESCRIPTION OF EMBODIMENTS

Construction and practice of various embodiments are discussed in detail below. However, it should be understood that a plurality of applicable inventive concepts provided in this application can be implemented in a plurality of environments. The embodiments discussed are merely illustrative of manners to implement and use the specification and the technologies, and do not limit the scope of this application. Unless defined otherwise, all technical and scientific terms used herein have the same meaning as commonly understood by a person having ordinary skill in the art to which this disclosure belongs.

In this application, "at least one" refers to one or more, and "a plurality of" refers to two or more. "And/or" describes an association relationship between associated objects, and represents that three relationships may exist. For example, A and/or B may represent the following cases:

A exists alone, both A and B exist, and B exists alone, where A and B may be singular or plural. The character "/" generally indicates an "or" relationship between the associated objects. "At least one of the following items (pieces)" or a similar expression thereof means any combination of the items, including a singular item (piece) or any combination of plural items (pieces). For example, at least one (piece) of a, b, or c may represent: a, b, c, a and b, a and c, b and c, or a, b, and c, where a, b, and c may be singular or plural. In addition, in the embodiments of this application, terms such as "first" and "second" do not limit a quantity or an execution sequence.

It should be noted that, in this application, the term such as "example" or "for example" is used to represent giving an example, an illustration, or descriptions. Any embodiment or design scheme described as an "example" or "for example" in this application should not be explained as being more preferred or having more advantages than another embodiment or design scheme. The use of the word such as "example" or "for example" is intended to present a related concept in a specific manner.

When being used to describe a tri-terminal switching element (for example, a switching transistor), a "first terminal" and a "second terminal" each may be a connection terminal of the tri-terminal switching element, and a "control terminal" may be a control terminal of the tri-terminal switching element. For example, for a MOS (metal-oxide-semiconductor) transistor, the control terminal may be a gate of the MOS transistor, the first terminal may be a source of the MOS transistor, and the second terminal may be a drain of the MOS transistor; or the first terminal may be a drain of the MOS transistor, and the second terminal may be a source of the MOS transistor.

Figure 2:
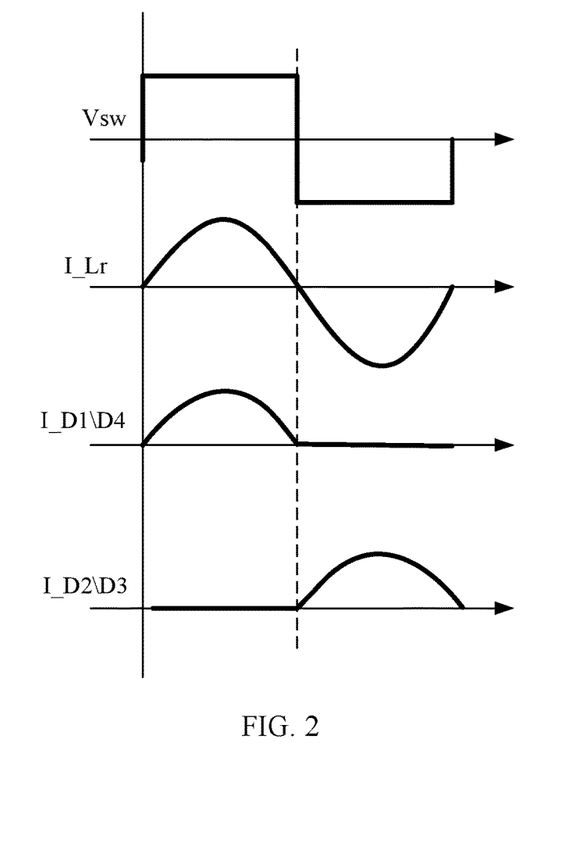
FIG. 2 is a schematic diagram of a signal waveform of a power supply conversion circuit according to an embodiment of this application.

Power conversion of a power supply conversion circuit is an important issue in many different electronic applications. An important aspect of power conversion is to efficiently convert power, that is, to keep a loss related to power conversion as low as possible. As shown in FIG. 1, a conventional power supply conversion circuit is provided. The power supply conversion circuit includes a bridge circuit 11, an LLC resonant network 12, a transformer 13, and a rectifier circuit 14. The bridge circuit 11 includes a full bridge circuit including four switching transistors S1 to S4, a first bridge arm of the full bridge circuit includes the switching transistors S1 and S2 connected in series between two electrodes (+ and −) of an alternating current power supply Vin, and a second bridge arm of the full bridge circuit includes the switching transistors S3 and S4 connected in series between the two electrodes (+ and −) of the alternating current power supply Vin. The LLC resonant network 12 includes a resonant capacitor Cr, a resonant inductor Lr, and a magnetic inductor Lm that are connected in series between an intermediate node a (namely, a connection point of the switching transistors S1 and S2) in the first bridge arm and an intermediate node b (namely, a connection point of the switching transistors S3 and S4) in the second bridge arm. The transformer 13 includes a primary coil Np and a secondary coil Ns. Two terminals of the primary coil Np are connected in parallel to the magnetic inductor Lm, and two terminals of the secondary coil Ns are connected to the rectifier circuit 14. The rectifier circuit 14 includes a rectifier bridge including four diodes D1 to D4. The diodes D1 and D2 are connected in series between two electrodes (+ and −) of an output terminal Vo. A cathode of D1 is connected to a positive electrode (+) of Vo, an anode of D1 and a cathode of D2 are connected to a node c, and an anode of D2 is connected to a negative electrode (−) of Vo. The diodes D3 and D4 are connected in series between the two electrodes (+ and −) of the output terminal Vo. A cathode of D3 is connected to the positive electrode (+) of Vo, an anode of D3 and a cathode of D4 are connected to a node d, and an anode of D4 is connected to the negative electrode (−) of Vo. The two terminals of the secondary coil Ns are separately connected to the node c and the node d. In addition, FIG. 1 further shows a filter capacitor Co used for filtering and an output resistor Ro. Two terminals of Co are separately connected to the two electrodes (+ and −) of the output terminal Vo, and two terminals of Ro are separately connected to the two electrodes (+ and −) of the output terminal Vo. Currently, in a power supply conversion circuit that uses an LLC topology, an input direct current signal is mainly sent to the bridge circuit 11 and converted into an alternating current signal, and then the alternating current signal is input to the LLC resonant cavity 12 and the transformer 13 for output by using the rectifier circuit 14. All power of the direct current signal may pass through switching transistors of the bridge circuit 11, the LLC resonant cavity 12, the transformer 13, and the rectifier circuit 14. As shown in FIG. 2, a waveform diagram of an output voltage Vsw of the bridge circuit 11, a waveform diagram of a current I_Lr of the resonant inductor Lr, a waveform diagram of a current I_D1/D4 output by the rectifier circuit 14 in a positive half cycle of I_Lr (where in the positive half cycle of I_Lr, an induced current of the secondary coil Ns is output to Vo through the diodes D1 and D4 in the rectifier circuit 14), and a waveform diagram of a current I_D2/D3 output by the rectifier circuit 14 in a negative half cycle of I_Lr (where in the negative half cycle of I_Lr, an induced current of the secondary coil Ns is output to Vo through the diodes D2 and D3 in the rectifier circuit 14) are provided. Because the switching transistors in the bridge circuit need to process all the power of the direct current signal, a withstand voltage of the switching transistors may be relatively high, and a gain range of power conversion of a switching transistor with a high withstand voltage is limited within a switching frequency range, causing low power conversion efficiency.

Embodiments of this application provide an electronic device. The electronic device may be, for example, a mobile phone, a tablet computer, a notebook computer, an ultra-mobile personal computer (UMPC), a netbook, a personal digital assistant (PDA), or an in-vehicle mobile apparatus.

Figure 3:
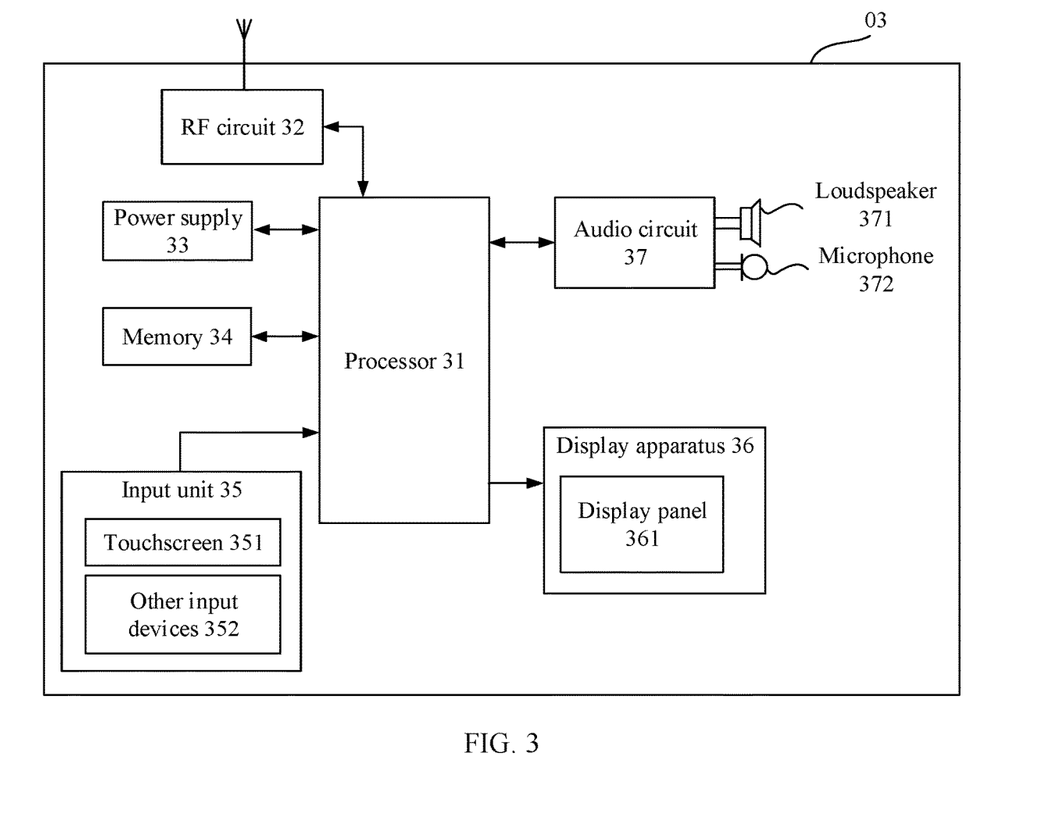
FIG. 3 is a schematic diagram of a structure of an electronic device according to an embodiment of this application.

FIG. 3 is a schematic diagram of an architecture of an example electronic device according to an embodiment of this application. As shown in FIG. 3, an electronic device 03 includes components such as a processor 31, a radio frequency (RF) circuit 32, a power supply 33, a memory 34, an input unit 35, a display apparatus 36, and an audio circuit 37. A person skilled in the art may understand that the structure of the electronic device shown in FIG. 3 does not constitute any limitation on the electronic device, and the electronic device may include more or fewer components than those shown in FIG. 3, or may include a combination of some of the components shown in FIG. 3, or may include components arranged differently from those shown in FIG. 3.

The processor 31 is a control center of the electronic device. The processor 31 is connected to all parts of the entire electronic device by using various interfaces and lines, and performs various functions of the electronic device and data processing by running or executing the software program and/or the module stored in the memory 34 and invoking data stored in the memory 34, to perform overall monitoring on the electronic device. In some embodiments, the processor 31 may include one or more processing units. Preferably, an application processor and a modem processor may be integrated into the processor 31. The application processor mainly processes the operating system, a user interface, an application, or the like. The modem processor mainly processes wireless communication. It should be understood that, the modem processor may alternatively not be integrated in the processor 31.

The RF circuit 32 may be configured to: receive and send a signal in an information receiving and sending process or a call process; and in particular, after receiving downlink information of a base station, send the downlink information to the processor 31 for processing; in addition, send uplink data to the base station. Generally, the RF circuit includes but is not limited to an antenna, at least one amplifier, a transceiver, a coupler, a low noise amplifier (LNA), a duplexer, and the like. In addition, the RF circuit 32 may further communicate with a network and another device through wireless communication. The wireless communication may use any communications standard or protocol, including but not limited to a global system for mobile communications (GSM), a general packet radio service (GPRS), code division multiple access (CDMA), wideband code division multiple access (WCDMA), long term evolution (LTE), an email, a short message service (SMS), and the like.

The electronic device includes the power supply 33 (such as a battery) that supplies power to the components. In some embodiments, the power supply may be logically connected to the processor 31 by using a power management system, to implement functions such as charging management, discharging management, and power consumption management by using the power management system. The power supply 33 may further include a power supply conversion circuit. For example, electricity is directly supplied to each component (load) by using the power supply conversion circuit, or a battery is charged and provided with electric energy by using the power supply conversion circuit. The power supply conversion circuit provided in this embodiment of this application may be disposed independently on the electronic device. For example, the electronic device includes only the power supply conversion circuit, and in this case, the electronic device may be a charging device. In some examples, the electronic device may be integrated with both the power supply conversion circuit and a load. For example, the electronic device may be a household appliance such as a refrigerator, a television set, or a washing machine. When the electronic device is a charging device, the load may be a mobile terminal or a battery in the mobile terminal. When the electronic device is a home appliance, the load may be an electronic component, for example, a motor, a display panel, a compressor, or a processor, in the appliance.

The memory 34 may be configured to store a software program and a module, and the processor 31 performs various function applications of the electronic device and data processing by running the software program and the module that are stored in the memory 34. The memory 34 may mainly include a program storage area and a data storage area. The program storage area may store an operating system, an application program required by at least one function (such as a sound play function and an image play function), and the like. The data storage area may store data (such as audio data, image data, and an address book) created based on use of the mobile phone, and the like. In addition, the memory 34 may include a high-speed random access memory, and may further include a non-volatile memory, for example, at least one magnetic disk storage device, a flash storage device, or another volatile solid-state storage device.

The input unit 35 may be configured to: receive entered digital or character information, and generate key signal input related to a user setting and function control of the electronic device. Specifically, the input unit 35 may include a touchscreen 351 and other input devices 352. The touchscreen 351 is also referred to as a touch panel, and can collect touch operations performed by a user on or near the touchscreen 351 (for example, an operation performed by the user on or near the touchscreen 351 by using any proper object or accessory such as a finger or a stylus), and drive a corresponding connection apparatus according to a preset program. In some embodiments, the touchscreen 351 may include two components: a touch detection apparatus and a touch controller. The touch detection apparatus detects a touch position of the user, detects a signal brought by the touch operation, and transfers the signal to the touch controller. The touch controller receives touch information from the touch detection apparatus, converts the touch information into coordinates of a touch point, and sends the coordinates to the processor 31. In addition, the touch controller can receive and execute a command sent by the processor 31. In addition, the touchscreen 351 may be implemented by using a plurality of types such as a resistor type, a capacitor type, an infrared type, and a surface acoustic wave type. The other input devices 352 may include but are not limited to one or more of a physical keyboard, a function key (such as a volume control key or a power on/off key), a trackball, a mouse, a joystick, or the like.

The display apparatus 36 may be configured to display information entered by the user or information provided for the user, and various menus of the electronic device. The display apparatus 36 may include a display panel 361. In this application, the display panel 361 may use an AMOLED display panel and a micro LED display panel. Further, the touchscreen 351 may cover the display panel 361. After detecting a touch operation on or near the touchscreen 351, the touchscreen 351 transfers the touch operation to the processor 31 to determine a type of a touch event. Then, the processor 31 provides a corresponding visual output on the display panel 361 based on the type of the touch event. Although, in FIG. 3, the touchscreen 351 and the display panel 361 are used as two independent components to implement input and output functions of the apparatus, in some embodiments, the touchscreen 351 and the display panel 361 may be integrated to implement the input and output functions of the apparatus.

The audio circuit 37, a loudspeaker 371, and a microphone 372 may provide an audio interface between the user and the electronic device. The audio circuit 37 may convert received audio data into an electrical signal and transmit the electrical signal to the loudspeaker 371. The loudspeaker 371 converts the electrical signal into a sound signal for output. In addition, the microphone 172 converts a collected sound signal into an electrical signal. The audio circuit 37 receives the electrical signal, converts the electrical signal into audio data, and then outputs the audio data to the RF circuit 32 to send the audio data to, for example, another electronic device, or outputs the audio data to the memory 34 for further processing.

In some embodiments, the electronic device shown in FIG. 3 may further include various sensors, for example, a gyroscope sensor, a hygrometer sensor, an infrared sensor, and a magnetometer sensor. Details are not described herein. In some embodiments, the electronic device shown in FIG.

1 may further include a wireless fidelity (WiFi) module, a Bluetooth module, and the like. Details are not described herein.

It may be understood that in embodiments of this application, the electronic device may perform some or all operations in embodiments of this application. These steps or operations are merely examples. In embodiments of this application, other operations or variations of various operations may be further performed. In addition, the operations may be performed in a sequence different from that presented in embodiments of this application, and not all operations in the embodiments of this application may need to be performed. Embodiments of this application may be separately implemented, or may be implemented in any combination. This is not limited in this application.

Figure 4:
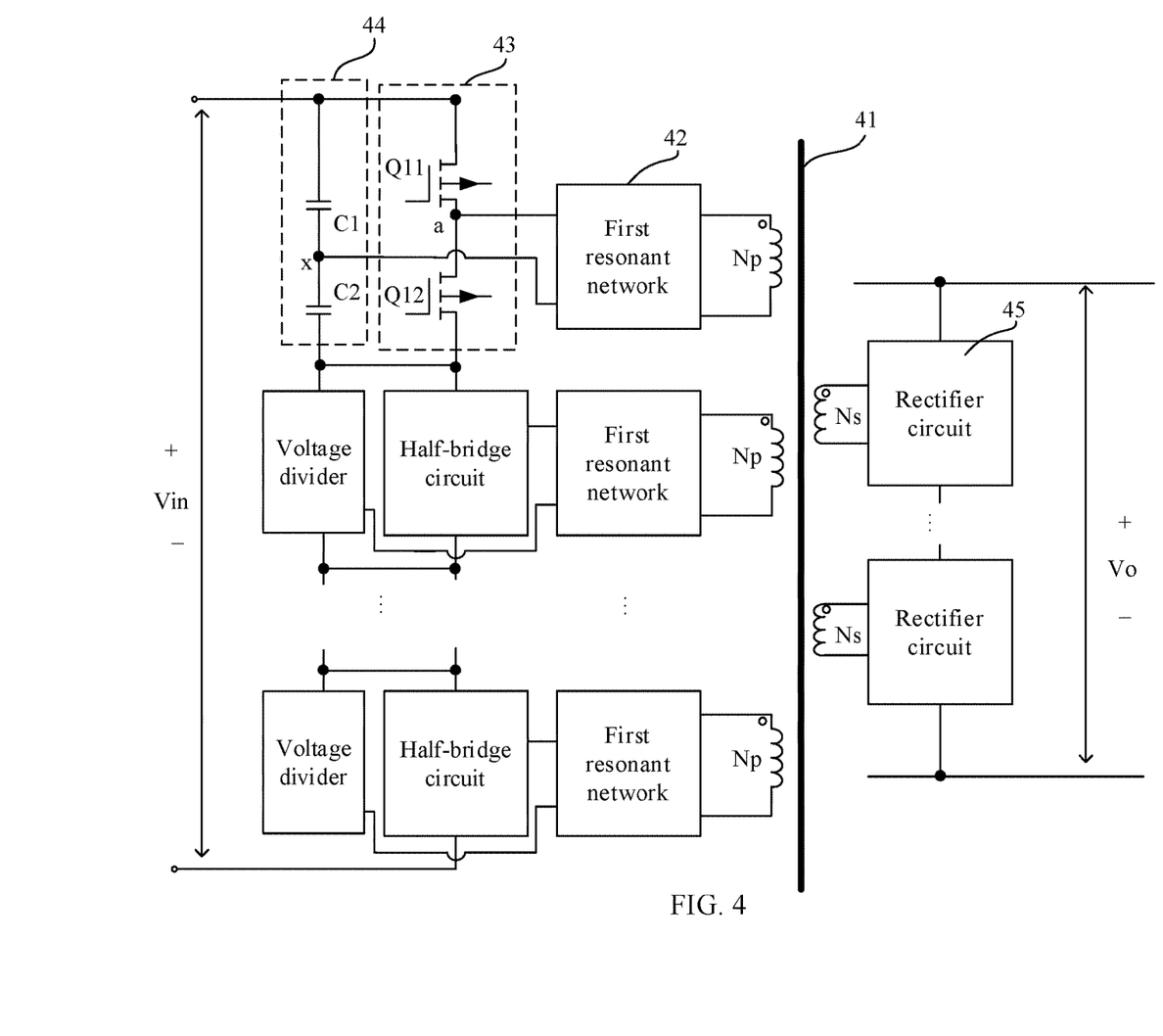
FIG. 4 is a schematic diagram of a structure of a power supply conversion circuit according to another embodiment of this application.

As shown in FIG. 4, an embodiment of this application provides a power supply conversion circuit, including an isolation transformer 41. The isolation transformer 41 includes at least two primary coils Np and at least one secondary coil Ns. Each primary coil Np is connected to a half-bridge circuit 43 by using a first resonant network 42, and half-bridge circuits 43 corresponding to the at least two primary coils Np are connected in series between two electrodes (+ and −) of a power supply Vin. The half-bridge circuit 43 is connected in parallel to a voltage divider 44, the voltage divider 44 includes a first capacitor C1 and a second capacitor C2 that are connected in series, one terminal of the first resonant network 42 is connected to an intermediate node a of the half-bridge circuit 43, and the other terminal of the first resonant network 42 is connected to a connection point x between the first capacitor C1 and the second capacitor C2. The secondary coil Ns is connected to an input terminal of a rectifier circuit 45, and an output terminal of a rectifier circuit 45 corresponding to the at least one secondary coil Ns is connected in series between two electrodes (+ and −) of an output terminal Vo of the power supply conversion circuit.

In the power supply conversion circuit provided in the foregoing solution, because the isolation transformer includes the at least two primary coils, the primary coils are separately connected to the half-bridge circuits by using resonant networks, the half-bridge circuits corresponding to the at least two primary coils are connected in series to the power supply, and the half-bridge circuit is connected in parallel to the voltage divider, a voltage of the power supply is divided by at least two half-bridge circuits. For example, when two primary coils are included, a divided voltage of each half-bridge circuit is one half of the voltage of the power supply. When three primary coils are included, a divided voltage of each half-bridge circuit is one third of the voltage of the power supply. Therefore, the half-bridge circuit may use a switching transistor with a lower withstand voltage. In comparison with the conventional technology, performance of the switching transistor with a lower withstand voltage is better than that of a switching transistor with a higher withstand voltage. This is mainly manifested as follows: The switching transistor with a lower withstand voltage has a greater gain range of power conversion within a switching frequency range, so that power conversion efficiency of the power supply conversion circuit can be improved.

As shown in FIG. 4, the half-bridge circuit 43 usually includes a first switching transistor Q11 and a second switching transistor Q12. A first terminal of the first switching transistor Q11 is connected to a first terminal (for example, a positive electrode +) of the power supply or a first terminal of the first switching transistor Q11 is connected to an adjacent previous half-bridge circuit. The half-bridge circuit 43 in FIG. 4 is the first half-bridge circuit, and therefore the first switching transistor Q11 is connected to the first terminal of the power supply. When the half-bridge circuit 43 is the second or the third half-bridge circuit, the first switching transistor Q11 is connected to a second terminal of a second switching transistor in the adjacent previous half-bridge circuit). A second terminal of the first switching transistor Q11 is connected to the intermediate node a, a first terminal of the second switching transistor Q12 is connected to the intermediate node a, and a second terminal of the second switching transistor Q12 is connected to a second terminal (for example, a negative electrode —) of the power supply or a second terminal of the second switching transistor Q12 is connected to an adjacent next half-bridge circuit. The first resonant network 32 includes a first series resonant inductor and a first magnetic inductor. The first magnetic inductor is connected in parallel to the primary coil, one terminal of the first series resonant inductor is connected to the intermediate node, the other terminal of the first series resonant inductor is connected to one terminal of the first magnetic inductor, and the other terminal of the first magnetic inductor is connected to the connection point between the first capacitor and the second capacitor. Alternatively, the first resonant network 32 includes a first series resonant capacitor. The first series resonant capacitor is connected in series between the one terminal of the first series resonant inductor and the intermediate node, or the first series resonant capacitor is connected in series between the other terminal of the first magnetic inductor and the connection point between the first capacitor and the second capacitor.

Figure 5:
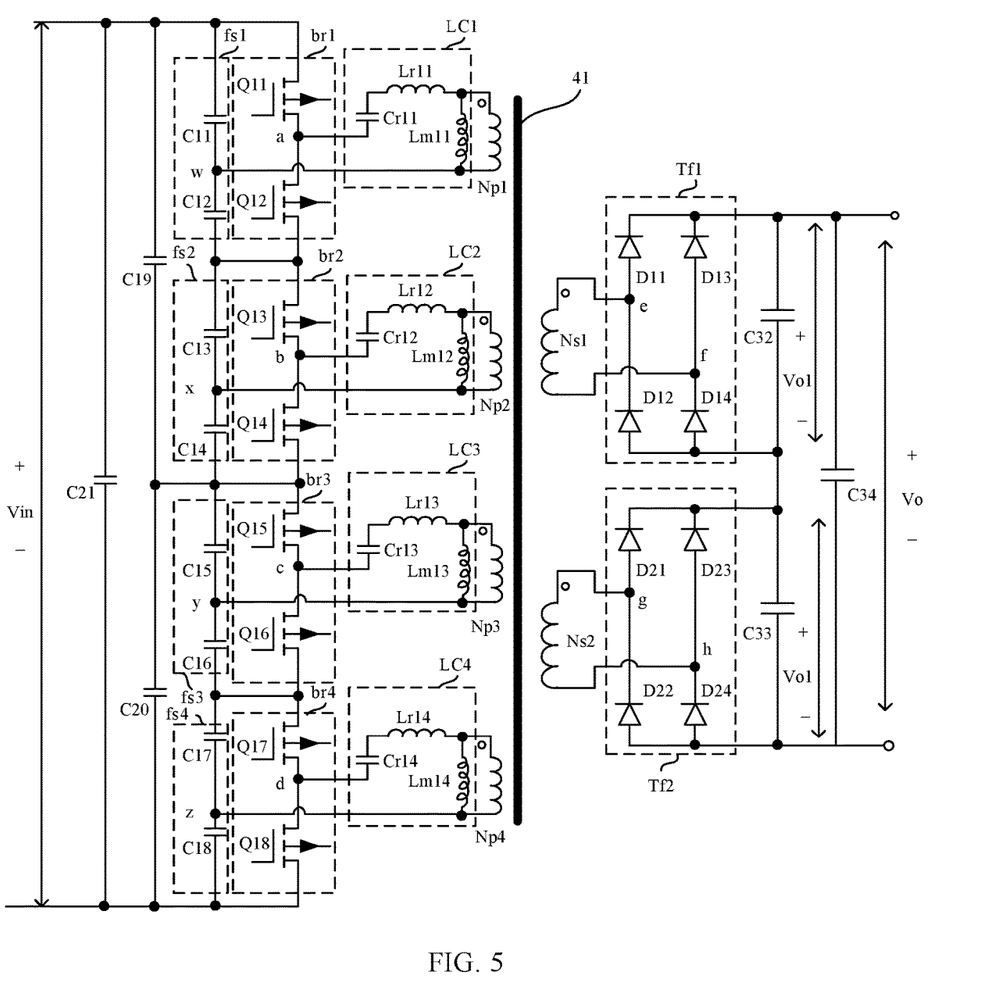
FIG. 5 is a schematic diagram of a structure of a power supply conversion circuit according to another embodiment of this application.
Figure 6:
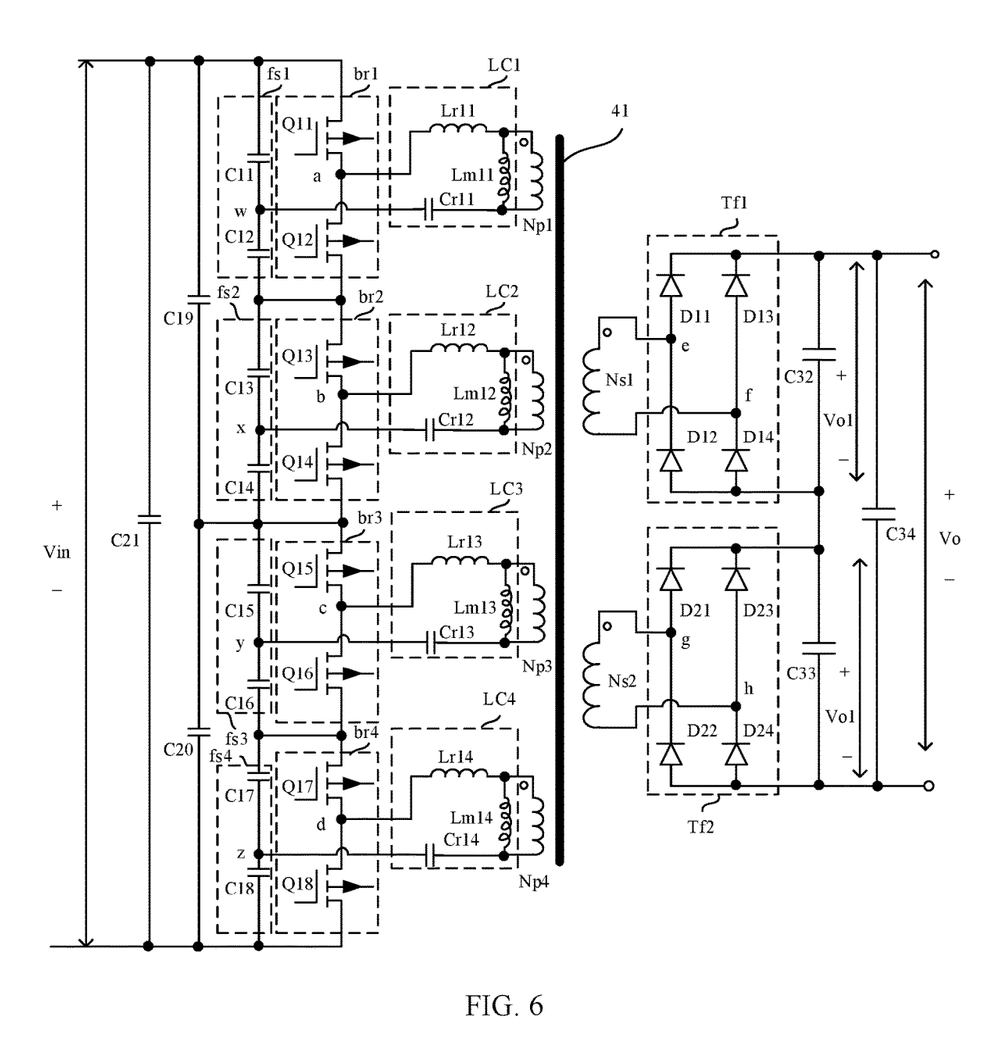
FIG. 6 is a schematic diagram of a structure of a power supply conversion circuit according to another embodiment of this application.

For example, as shown in FIG. 5 and FIG. 6, the isolation transformer 41 includes four primary coils Np1, Np2, Np3, and Np4 and two secondary coils Ns1 and Ns2. The primary coil Np1 is connected to a half-bridge circuit br1 by using a resonant network LC1, the primary coil Np2 is connected to a half-bridge circuit br2 by using a resonant network LC2, the primary coil Np3 is connected to a half-bridge circuit br3 by using a resonant network LC3, and the primary coil Np4 is connected to a half-bridge circuit br4 by using a resonant network LC4. The half-bridge circuit br1 includes a switching transistor Q11 and a switching transistor Q12. The half-bridge circuit br2 includes a switching transistor Q13 and a switching transistor Q14. The half-bridge circuit br3 includes a switching transistor Q15 and a switching transistor Q16. The half-bridge circuit br4 includes a switching transistor Q17 and a switching transistor Q18. The switching transistors Q11 to Q18 are connected in series between the two electrodes (+ and −) of the power supply Vin. A voltage divider fs1 includes capacitors C11 and C12. A voltage divider fs2 includes capacitors C13 and C14. A voltage divider fs3 includes capacitors C15 and C16. A voltage divider fs4 includes capacitors C17 and C18. C11 to C18 are connected in series between the two electrodes (+ and −) of the power supply Vin. The resonant network LC1 includes a series resonant inductor Lr11, a magnetic inductor Lm11, and a series resonant capacitor Cr11. The series resonant inductor Lr11 and the magnetic inductor Lm11 are connected in series between an intermediate node a (a connection point between the switching transistor Q11 and the switching transistor Q12) of the half-bridge circuit br1 and a connection point w of C11 and C12, and the series resonant capacitor Cr11 is connected in series between Lr11 and the intermediate node a (as shown in FIG. or the series resonant capacitor Cr11 is connected in series between the magnetic inductor Lm11 and the connection point w (as shown in FIG.

6). The resonant network LC2 includes a series resonant inductor Lr12, a magnetic inductor Lm12, and a series resonant capacitor Cr12. The series resonant inductor Lr12 and the magnetic inductor Lm12 are connected in series between an intermediate node b (a connection point of the switching transistor Q13 and the switching transistor Q14) of the half-bridge circuit br2 and a connection point x of C13 and C14, and the series resonant capacitor Cr12 is connected in series between Lr12 and the intermediate node b (as shown in FIG. or the series resonant capacitor Cr12 is connected in series between the magnetic inductor Lm12 and the connection point x (as shown in FIG. 6). The resonant network LC3 includes a series resonant inductor Lr13, a magnetic inductor Lm13, and a series resonant capacitor Cr13. The series resonant inductor Lr13 and the magnetic inductor Lm13 are connected in series between an intermediate node c (a connection point of the switching transistor Q15 and the switching transistor Q16) of the half-bridge circuit br3 and a connection pointy of C15 and C16, and the series resonant capacitor Cr13 is connected in series between Lr13 and the intermediate node c (as shown in FIG. or the series resonant capacitor Cr13 is connected in series between the magnetic inductor Lm13 and the connection point y (as shown in FIG. 6). The resonant network LC4 includes a series resonant inductor Lr14, a magnetic inductor Lm14, and a series resonant capacitor Cr14. The series resonant inductor Lr14 and the magnetic inductor Lm14 are connected in series between an intermediate node d (a connection point of the switching transistor Q17 and the switching transistor Q18) of the half-bridge circuit br4 and a connection point z of C17 and C18, and the series resonant capacitor Cr14 is connected in series between Lr14 and the intermediate node d (as shown in FIG. or the series resonant capacitor Cr14 is connected in series between the magnetic inductor Lm14 and the connection point z (as shown in FIG. 6). To ensure a voltage division effect of each half-bridge circuit, when there are an even number of primary coils Np, for example, when four primary coils are included, a parallel capacitor may be further disposed for two adjacent half-bridge circuits. As shown in FIG. 5 and FIG. 6, capacitors C19 and C20 are further included. A series structure of the half-bridge circuit br1 and the half-bridge circuit br2 is connected in parallel to C19, and a series structure of the half-bridge circuit br3 and the half-bridge circuit br4 is connected in parallel to C20. In addition, to ensure power supply stability, FIG. 5 and FIG. 6 further show a capacitor C21 connected in parallel between the two electrodes of the power supply. A rectifier circuit Tf1 includes a rectifier bridge including four diodes D11 to D14. The diodes D11 and D12 are connected in series between two electrodes (+ and −) of an output terminal Vo1 of the rectifier circuit Tf1. A cathode of D11 is connected to a positive electrode (+) of Vo1, an anode of D11 and a cathode of D12 are connected to a node e, and an anode of D12 is connected to a negative electrode (−) of Vo1. The diodes D13 and D14 are connected in series between the two electrodes (+ and −) of the output terminal Vo1 of the rectifier circuit Tf1. A cathode of D13 is connected to the positive electrode (+) of Vo1, an anode of D13 and a cathode of D14 are connected to a node f, and an anode of D14 is connected to the negative electrode (−) of Vo1. Two terminals of the secondary coil Ns1 are separately connected to the node e and the node f A rectifier circuit Tf2 includes a rectifier bridge including four diodes D21 to D24. The diodes D21 and D22 are connected in series between two electrodes (+ and −) of an output terminal Vo2 of the rectifier circuit Tf2. A cathode of D21 is connected to a positive electrode (+) of Vo2, an anode of D21 and a cathode of D22 are connected to a node g, and an anode of D22 is connected to a negative electrode (−) of Vo2. The diodes D23 and D24 are connected in series between the two electrodes (+ and −) of the output terminal Vo2 of the rectifier circuit Tf2. A cathode of D23 is connected to the positive electrode (+) of Vo2, an anode of D23 and a cathode of D24 are connected to a node h, and an anode of D24 is connected to the negative electrode (−) of Vo2. Two terminals of the secondary coil Ns2 are separately connected to the node g and the node h. In some examples, a rectifier capacitor C32 is connected between the two electrodes (+ and −) of Vo1, and a rectifier capacitor C33 is connected between the two electrodes (+ and −) of Vo2. The output terminal Vo1 and the output terminal Vo2 are connected in series between the two electrodes (+ and −) of the output terminal Vo of the power supply conversion circuit. In some examples, a rectifier capacitor C34 is connected between the two electrodes (+ and −) of the output terminal Vo of the power supply conversion circuit. A non-synchronous rectifier circuit is used as the rectifier circuit shown in FIG. 5 and FIG. 6, and a rectifier tube in a rectifier bridge of the rectifier circuit is a diode.

Figure 8:
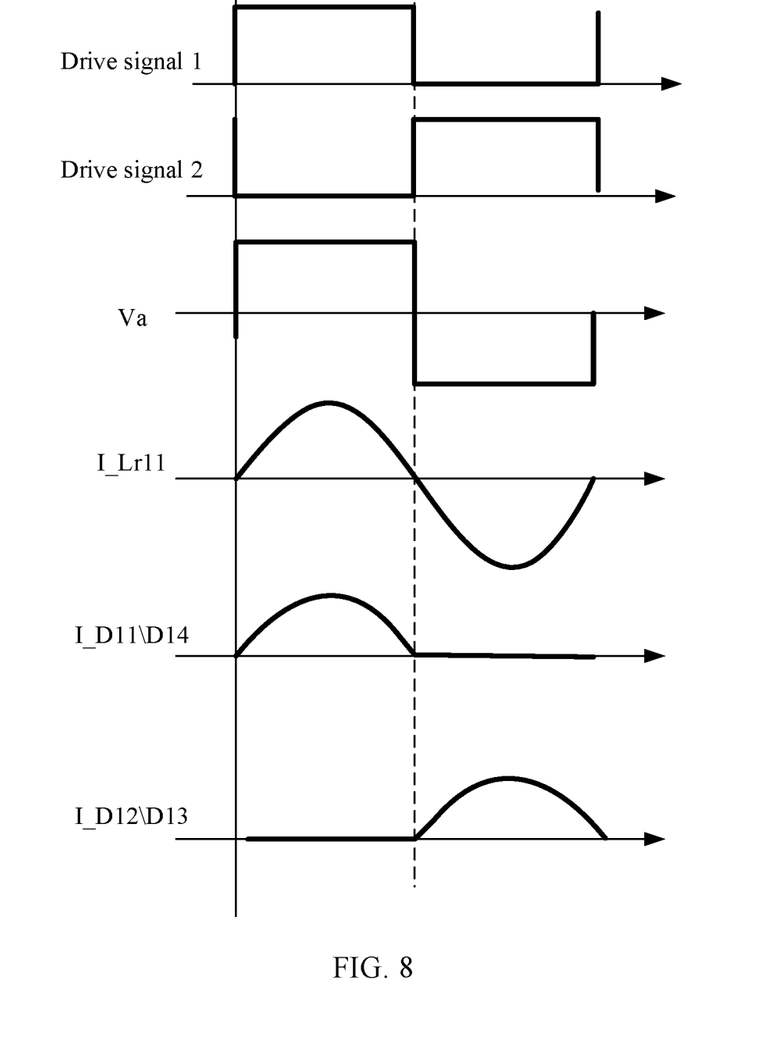
FIG. 8 is a schematic diagram of a signal waveform of a power supply conversion circuit according to an embodiment of this application.

In the foregoing solution, because the first resonant network is an LLC resonant network, zero voltage switch (ZVS) turn-on and zero current switch (ZCS) turn-off control over the switching transistor in the half-bridge circuit can be implemented, so that efficiency of the power supply conversion circuit is ensured. For details, refer to signal timing diagrams provided in FIG. 8. Q11, Q13, Q15, and Q17 use a drive signal 1 of a same waveform, and Q12, Q14, Q16, and Q18 use a drive signal 2 of a same waveform. For example, all the switching transistors are PMOSs conducted when a control terminal inputs a high level. FIG. 8 provides waveform diagrams of drive signals of the switching transistors Q11 to Q18, a waveform diagram of a voltage Va of the node a, a waveform diagram of a current I_Lr11 of the series resonant inductor Lr11, a waveform diagram of a current I_D11/D14 output by the rectifier circuit Tf1 in a positive half cycle of I_Lr11 (where in the positive half cycle of I_Lr11, an induced current of the secondary coil Ns1 is output to Vo1 through the diodes D11 and D14 in the rectifier circuit Tf1), and a waveform diagram of a current I_D12/D13 output by the rectifier circuit Tf1 in a negative half cycle of I_Lr11 (where in the negative half cycle of I_Lr11, an induced current of the secondary coil Ns1 is output to Vo1 through the diodes D12 and D13 in the rectifier circuit Tf1). A waveform of a waveform diagram of a signal of each node shown in FIG. 8 is similar to that shown in FIG. 2. However, in the solution shown in FIG. 5 or FIG. 6, the plurality of half-bridge circuits are connected in series for voltage division. Therefore, a waveform amplitude of the waveform diagram of the signal of each node shown in FIG. 8 is less than a waveform amplitude of the waveform diagram of the signal of each node shown in FIG. 2. For example, in a case of a same power supply voltage, an amplitude of the voltage Va in FIG. 8 is one quarter of that of Vsw in FIG. 2.

Figure 7:
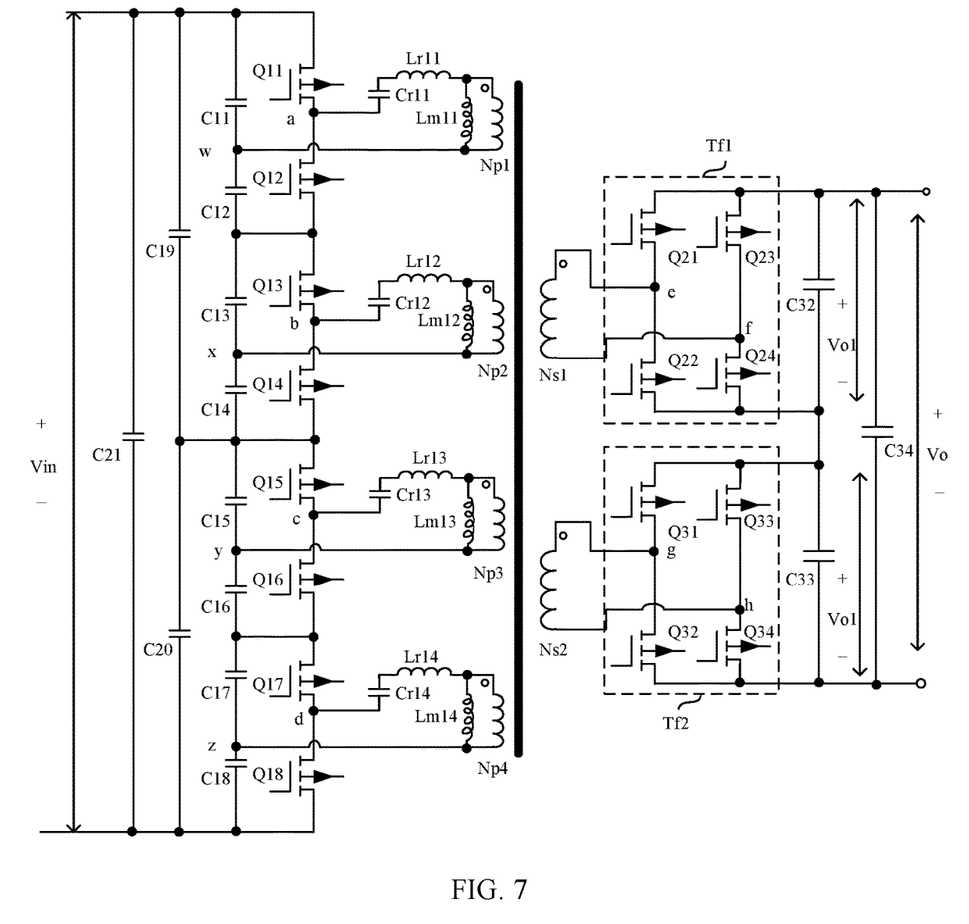
FIG. 7 is a schematic diagram of a structure of a power supply conversion circuit according to another embodiment of this application.

In some optional embodiments, as shown in FIG. 7, when a synchronous rectifier circuit is used as the rectifier circuit, a rectifier tube in a rectifier bridge of the rectifier circuit is a switching transistor. A rectifier circuit Tf1 includes a rectifier bridge including four switching transistors Q21 to Q24. The switching transistors Q21 and Q22 are connected in series between two electrodes (+ and −) of an output terminal Vo1 of the rectifier circuit Tf1. A first terminal of Q21 is connected to a positive electrode (+) of Vo1, a second terminal of Q21 and a first terminal of Q22 are connected to a node e, and a second terminal of Q22 is connected to a negative electrode (−) of Vo1. The switching transistors Q23 and Q24 are connected in series between the two electrodes (+ and −) of the output terminal Vo1 of the rectifier circuit Tf1. A first terminal of Q23 is connected to the positive electrode (+) of Vo1, a second terminal of Q23 and a first terminal of Q24 are connected to a node f, and a second terminal of Q24 is connected to the negative electrode (−) of Vo1. Two terminals of the secondary coil Ns1 are separately connected to the node e and the node f. A rectifier circuit Tf2 includes a rectifier bridge including four switching transistors Q31 to Q34. The switching transistors Q31 and Q32 are connected in series between two electrodes (+ and —) of an output terminal Vo2 of the rectifier circuit Tf2. A first terminal of Q31 is connected to a positive electrode (+) of Vo2, a second terminal of Q31 and a first terminal of Q32 are connected to a node g, and a second terminal of Q32 is connected to a negative electrode (−) of Vo2. The switching transistors Q33 and Q34 are connected in series between the two electrodes (+ and —) of the output terminal Vo2 of the rectifier circuit Tf2. A first terminal of Q33 is connected to the positive electrode (+) of Vo2, a second terminal of Q33 and a first terminal of Q34 are connected to a node h, and a second terminal of Q34 is connected to the negative electrode (−) of Vo2. Two terminals of the secondary coil Ns2 are separately connected to the node g and the node h.

Figure 9:
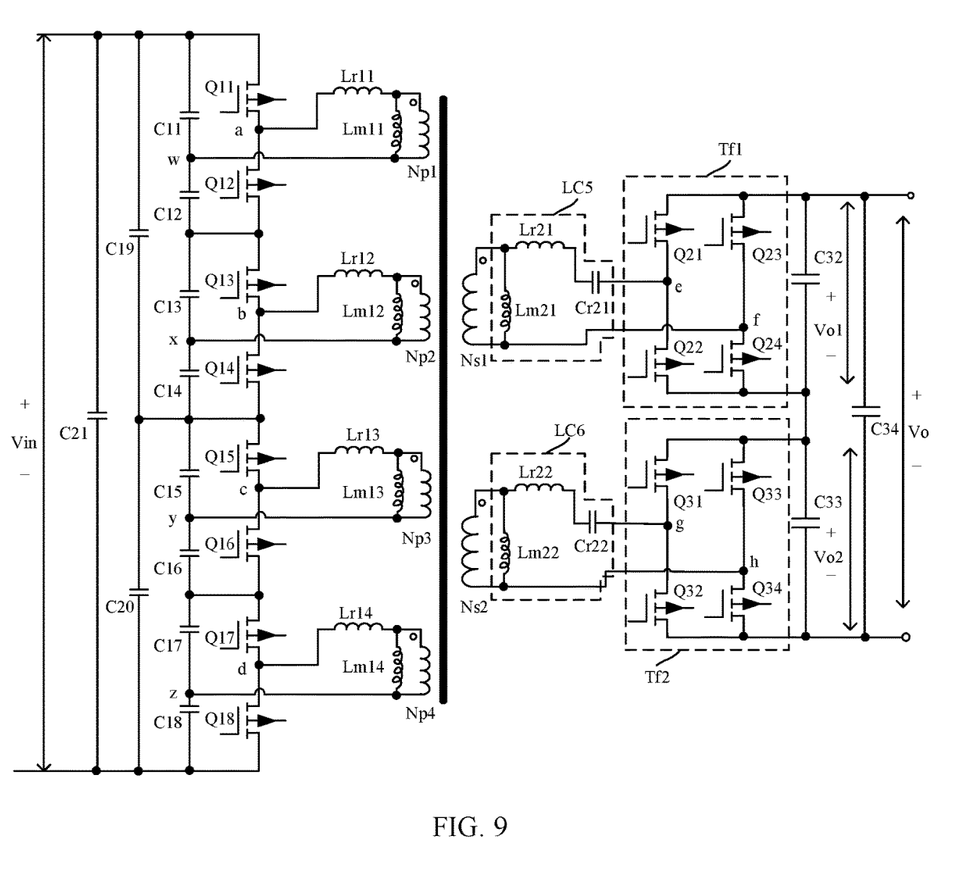
FIG. 9 is a schematic diagram of a structure of a power supply conversion circuit according to another embodiment of this application.

In the foregoing solution, an example in which the first resonant network connected to the primary coil is an LLC resonant circuit is used. Certainly, in some embodiments, the secondary coil Ns may be connected to the input terminal of the rectifier circuit by using a second resonant network, and when the second resonant network is an LLC resonant network, the first series resonant capacitor is not disposed in the first resonant network. Specifically, the secondary coil Ns is connected to the input terminal of the rectifier circuit by using the second resonant network. The second resonant network includes a second series resonant capacitor, a second series resonant inductor, and a second magnetic inductor. A first terminal of the second series resonant capacitor is connected to a first input terminal of the rectifier circuit, a second terminal of the second series resonant capacitor is connected to a first terminal of the second series resonant inductor, a second terminal of the second series resonant inductor is connected to a first terminal of the second magnetic inductor, and a second terminal of the second magnetic inductor is connected to a second input terminal of the rectifier circuit. As shown in FIG. 9, for example, the isolation transformer 31 includes two secondary coils Ns1 and Ns2. The secondary coil Ns1 is connected to input terminals (namely, the nodes e and f) of the rectifier circuit Tf1 by using a resonant network LC5. The secondary coil Ns2 is connected to input terminals (namely, the nodes g and h) of the rectifier circuit Tf2 by using a resonant network LC6. The resonant network LC5 includes a series resonant capacitor Cr21, a series resonant inductor Lr21, and a magnetic inductor Lm21. The series resonant capacitor Cr21, the series resonant inductor Lr21, and the magnetic inductor Lm21 are connected in series between the nodes e and f, and the secondary coil Ns1 is connected in parallel to the magnetic inductor Lm21. The resonant network LC6 includes a series resonant capacitor Cr22, a series resonant inductor Lr22, and a magnetic inductor Lm22. The series resonant capacitor Cr22, the series resonant inductor Lr22, and the magnetic inductor Lm22 are connected in series between the nodes g and h, and the secondary coil Ns2 is connected in parallel to the magnetic inductor Lm22. Because the second resonant network forms an LLC network, when a synchronous rectifier circuit is used as the rectifier circuit, in other words, when a rectifier tube in a rectifier bridge of the rectifier circuit is a switching transistor, ZVS turn-on and ZCS turn-off control over the switching transistor can be implemented, so that efficiency of the power supply conversion circuit is ensured.

Figure 10:
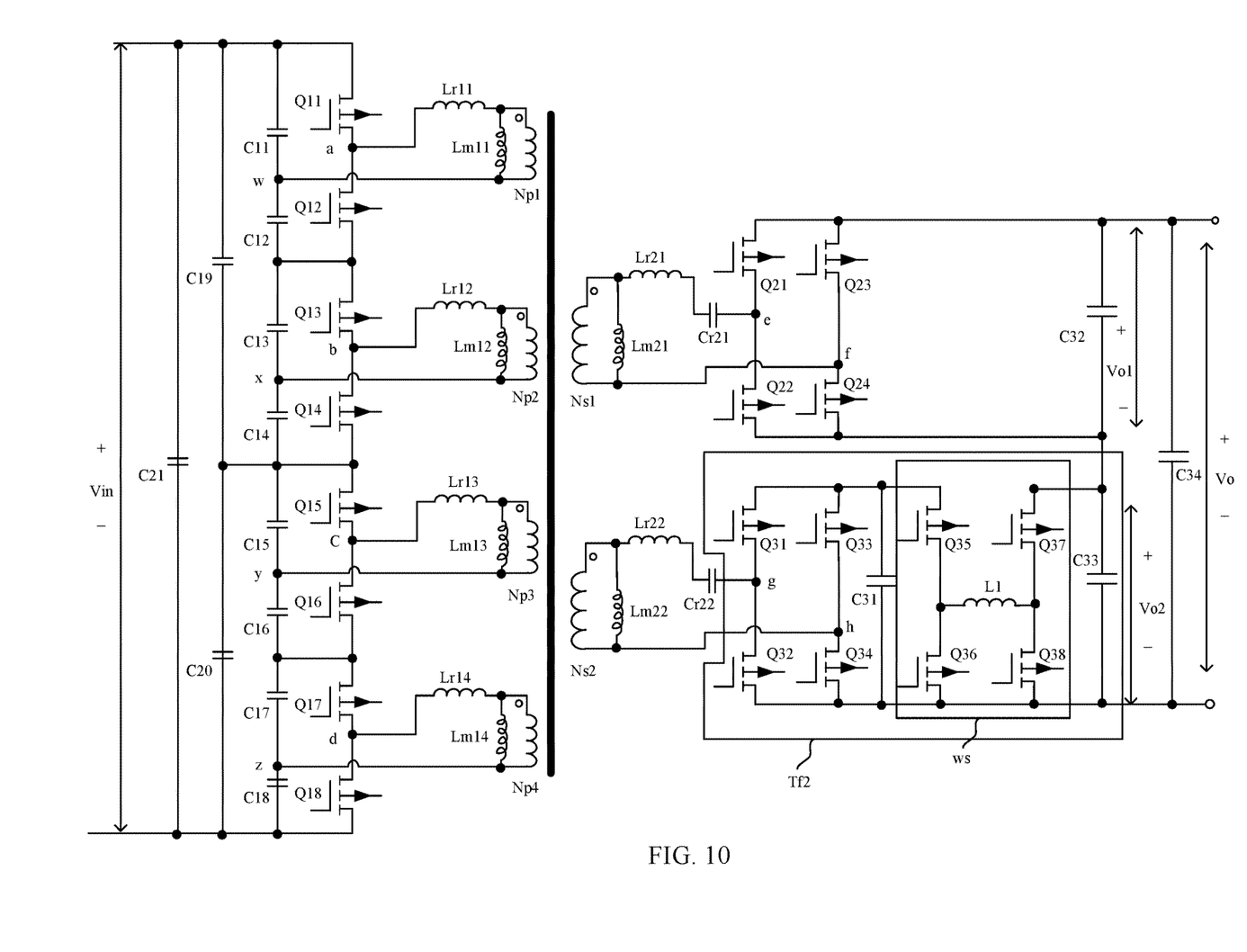
FIG. 10 is a schematic diagram of a structure of a power supply conversion circuit according to another embodiment of this application.

In addition, as shown in FIG. 10, the power supply conversion circuit includes at least two secondary coils Ns, and a rectifier circuit of any one of the secondary coils further includes a voltage regulator circuit. The voltage regulator circuit is disposed between a rectifier bridge of the rectifier circuit and an output terminal of the rectifier circuit, and the voltage regulator circuit is configured to adjust a voltage output by the rectifier bridge to the output terminal of the rectifier circuit. As shown in FIG. 10, the rectifier circuit Tf2 includes a rectifier bridge including four switching transistors Q31 to Q34 and a voltage regulator circuit ws. The voltage regulator circuit ws is disposed between the rectifier bridge of the rectifier circuit and the output terminal Vo2 of the rectifier circuit Tf2. The voltage regulator circuit ws includes a buck-boost buckboost circuit, a buck buck circuit, and a boost boost circuit. Taking the buckboost circuit as an example, the voltage regulator circuit ws includes switching transistors Q35 to Q38 and an inductor L1. A first terminal of Q35 is connected to a first terminal of Q33, a second terminal of Q35 is connected to a first terminal of Q36, a second terminal of Q36 is connected to the negative electrode (−) of Vo2, a first terminal of L1 is connected to the first terminal of Q35, a first terminal of Q37 is connected to the positive electrode (+) of Vo2, a second terminal of Q37 is connected to a second terminal of the inductor L1, a first terminal of Q38 is connected to a second terminal of Q37, and a second terminal of Q38 is connected to the negative electrode (−) of Vo2. In some solutions, to ensure voltage stability on both sides of the voltage regulator circuit Tf2, a capacitor C31 connected in parallel to an output terminal of the rectifier bridge including Q31 to Q34 is further included. Two terminals of C31 are separately connected to the first terminal of Q35 and the second terminal of Q36. In the solution shown in FIG. 10, a voltage finally output by the power supply conversion circuit is Vo=Vo1+Vo2. In this solution, the voltage regulator circuit only needs to perform voltage regulation on Vo2, and does not need to perform voltage regulating on all power of Vo. Therefore, a requirement on a withstand voltage of the switching transistor in the voltage regulator circuit is reduced, so that a low-voltage switching transistor with a lower withstand voltage can be used, thereby improving conversion efficiency.

In conclusion, it should be noted that the foregoing descriptions are merely example embodiments of this application. However, the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. A power supply conversion circuit comprising an isolation transformer,
   wherein the isolation transformer comprises at least two primary coils and at least one secondary coil,
   wherein each primary coil of the at least two primary coils is connected to a half-bridge circuit by a first resonant network, and the respective half-bridge circuits corresponding to the at least two primary coils are connected in series between two electrodes of a power supply, wherein each respective half-bridge circuit of the half-bridge circuits is connected in parallel to a voltage divider, the voltage divider comprises a first capacitor and a second capacitor that are connected in series, a first terminal of the first resonant network is connected to an intermediate node of the respective half-bridge circuit, and a second terminal of the first resonant network is connected to a connection point between the first capacitor and the second capacitor, and wherein the at least one secondary coil is connected to an input terminal of a rectifier circuit, and an output terminal of the rectifier circuit corresponding to the at least one secondary coil is connected in series between two electrodes of an output terminal of the power supply conversion circuit.

2. The power supply conversion circuit according to claim 1, wherein the respective half-bridge circuit comprises a first switching transistor and a second switching transistor, a first terminal of the first switching transistor is connected to a first terminal of the power supply or a first terminal of the first switching transistor is connected to an adjacent previous half-bridge circuit, a second terminal of the first switching transistor is connected to the intermediate node, a first terminal of the second switching transistor is connected to the intermediate node, and a second terminal of the second switching transistor is connected to a second terminal of the power supply or a second terminal of the second switching transistor is connected to an adjacent next half-bridge circuit.

3. The power supply conversion circuit according to claim 1, wherein the first resonant network comprises a first series resonant inductor, a first magnetic inductor, and a first series resonant capacitor, wherein the first magnetic inductor is connected in parallel to the primary coil, a first terminal of the first series resonant inductor is connected to the intermediate node, a second terminal of the first series resonant inductor is connected to a first terminal of the first magnetic inductor, and a second terminal of the first magnetic inductor is connected to the connection point between the first capacitor and the second capacitor; and the first series resonant capacitor is connected in series between the first terminal of the first series resonant inductor and the intermediate node, or the first series resonant capacitor is connected in series between the second terminal of the first magnetic inductor and the connection point between the first capacitor and the second capacitor.

4. The power supply conversion circuit according to claim 1, wherein the first resonant network comprises a first series resonant inductor and a first magnetic inductor, wherein the first magnetic inductor is connected in parallel to the primary coil, a first terminal of the first series resonant inductor is connected to the intermediate node, a second terminal of the first series resonant inductor is connected to a first terminal of the first magnetic inductor, and a second terminal of the first magnetic inductor is connected to the connection point between the first capacitor and the second capacitor.

5. The power supply conversion circuit according to claim 4, wherein the secondary coil is connected to the input terminal of the rectifier circuit by a second resonant network; and the second resonant network comprises a second series resonant capacitor, a second series resonant inductor, and a second magnetic inductor, wherein a first terminal of the second series resonant capacitor is connected to a first input terminal of the rectifier circuit, a second terminal of the second series resonant capacitor is connected to a first terminal of the second series resonant inductor, a second terminal of the second series resonant inductor is connected to a first terminal of the second magnetic inductor, and a second terminal of the second magnetic inductor is connected to a second input terminal of the rectifier circuit.

6. The power supply conversion circuit according to claim 5, wherein the power supply conversion circuit comprises at least two secondary coils, the rectifier circuit of any one of the at least two secondary coils further comprises a voltage regulator circuit between a rectifier bridge of the rectifier circuit and an output terminal of the rectifier circuit, and the voltage regulator circuit is configured to adjust a voltage output by the rectifier bridge to the output terminal of the rectifier circuit.

7. The power supply conversion circuit according to claim 6, wherein the voltage regulator circuit comprises a buck-boost buckboost circuit, a buck buck circuit, and a boost boost circuit.

8. The power supply conversion circuit according to claim 1, wherein:

the rectifier circuit comprises a synchronous rectifier circuit, and a rectifier tube in a rectifier bridge of the rectifier circuit comprises a switching transistor; or the rectifier circuit comprises a non-synchronous rectifier circuit, and a rectifier tube in a rectifier bridge of the rectifier circuit comprises a diode.

9. A power supply conversion circuit, comprising an isolation transformer, wherein the isolation transformer comprises four primary coils and at least one secondary coil, wherein each of the four primary coils is connected to a half-bridge circuit by a first resonant network, and the respective half-bridge circuits corresponding to the four primary coils are connected in series between two electrodes of a power supply, wherein each respective half-bridge circuit of the half-bridge circuits is connected in parallel to a voltage divider, the voltage divider comprises a first capacitor and a second capacitor that are connected in series, a first terminal of the first resonant network is connected to an intermediate node of the respective half-bridge circuit, and a second terminal of the first resonant network is connected to a connection point between the first capacitor and the second capacitor, and wherein the at least one secondary coil is connected to an input terminal of a rectifier circuit, and an output terminal of the rectifier circuit corresponding to the at least one secondary coil is connected in series between two electrodes of an output terminal of the power supply conversion circuit.

10. The power supply conversion circuit according to claim 9, wherein the respective half-bridge circuit comprises a first switching transistor and a second switching transistor, a first terminal of the first switching transistor is connected to a first terminal of the power supply or a first terminal of the first switching transistor is connected to an adjacent previous half-bridge circuit, a second terminal of the first switching transistor is connected to the intermediate node, a first terminal of the second switching transistor is connected to the intermediate node, and a second terminal of the second switching transistor is connected to a second terminal of the power supply or a second terminal of the second switching transistor is connected to an adjacent next half-bridge circuit.

11. The power supply conversion circuit according to claim 9, wherein the first resonant network comprises a first series resonant inductor, a first magnetic inductor, and a first series resonant capacitor, wherein the first magnetic inductor is connected in parallel to the primary coil, a first terminal of the first series resonant inductor is connected to the intermediate node, a second terminal of the first series resonant inductor is connected to a first terminal of the first magnetic inductor, and a second terminal of the first magnetic inductor is connected to the connection point between the first capacitor and the second capacitor; and the first series resonant capacitor is connected in series between the first terminal of the first series resonant inductor and the intermediate node, or the first series resonant capacitor is connected in series between the second terminal of the first magnetic inductor and the connection point between the first capacitor and the second capacitor.

12. The power supply conversion circuit according to claim 9, wherein the first resonant network comprises a first series resonant inductor and a first magnetic inductor, wherein the first magnetic inductor is connected in parallel to the primary coil, a first terminal of the first series resonant inductor is connected to the intermediate node, a second terminal of the first series resonant inductor is connected to a first terminal of the first magnetic inductor, and a second terminal of the first magnetic inductor is connected to the connection point between the first capacitor and the second capacitor.

13. The power supply conversion circuit according to claim 12, wherein the secondary coil is connected to the input terminal of the rectifier circuit by a second resonant network; and the second resonant network comprises a second series resonant capacitor, a second series resonant inductor, and a second magnetic inductor, wherein a first terminal of the second series resonant capacitor is connected to a first input terminal of the rectifier circuit, a second terminal of the second series resonant capacitor is connected to a first terminal of the second series resonant inductor, a second terminal of the second series resonant inductor is connected to a first terminal of the second magnetic inductor, and a second terminal of the second magnetic inductor is connected to a second input terminal of the rectifier circuit.

14. The power supply conversion circuit according to claim 13, wherein the power supply conversion circuit comprises at least two secondary coils, the rectifier circuit of any one of the secondary coils further comprises a voltage regulator circuit between a rectifier bridge of the rectifier circuit and an output terminal of the rectifier circuit, and the voltage regulator circuit is configured to adjust a voltage output by the rectifier bridge to the output terminal of the rectifier circuit.

15. The power supply conversion circuit according to claim 14, wherein the voltage regulator circuit comprises a buck-boost buckboost circuit, a buck buck circuit, and a boost boost circuit.

16. The power supply conversion circuit according to claim 9, wherein:

the rectifier circuit comprises a synchronous rectifier circuit, and a rectifier tube in a rectifier bridge of the rectifier circuit comprises a switching transistor; or the rectifier circuit comprises a non-synchronous rectifier circuit, and a rectifier tube in a rectifier bridge of the rectifier circuit comprises a diode.

* * * * *